3,445,937
PURIFICATION OF PIGMENTS
James Dennis Groves, Redcar, England, assignor to British Titan Products Company Limited, Billingham, England, a corporation of the United Kingdom
Filed Aug. 11, 1966, Ser. No. 571,859
Claims priority, application Great Britain, Aug. 11, 1965, 34,309/65
Int. Cl. F26b 3/06, 17/20
U.S. Cl. 34—33                5 Claims

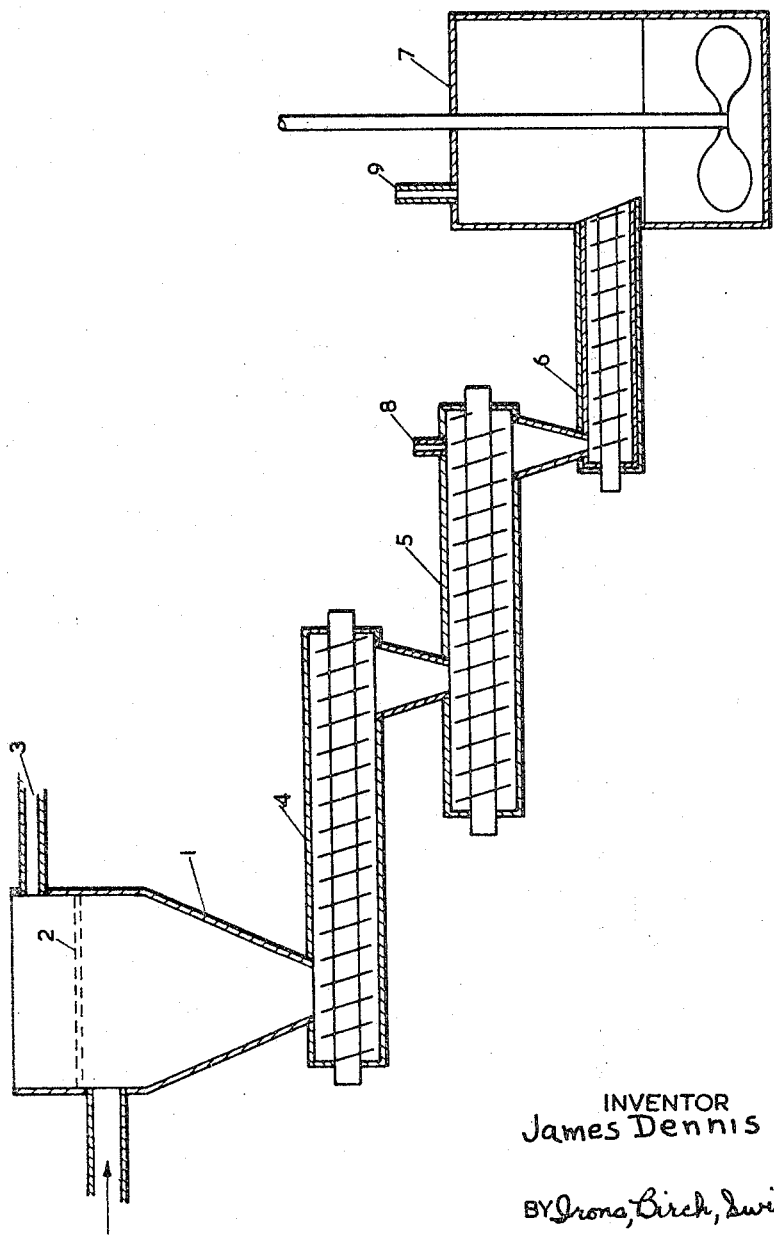

ABSTRACT OF THE DISCLOSURE

A method for the removal of occluded gases, such as halogen, from solid particulate material, such as titanium dioxide, wherein a carrier gas, such as air, is passed in countercurrent relation to the solid particulate material. The solids are moved with mixing agitation and the carrier gas passing therethrough strips the occluded gases from the solid materials. A sealed screw conveyor may be suitably employed for carrying out the process.

---

The present invention relates to improved methods for the transport and recovery of particulate solids containing an occluded gas or gases.

The invention is particularly applicable to the recovery of metal oxides such as pigmentary titanium dioxide formed from the oxidation in the vapour phase of a metal halide such as titanium tetrachloride.

Difficulty has been experienced in the handling of particulate solids such as metal oxides produced by the vapour phase oxidation of a metal halide due to the occlusion by the solid of halogen, particularly chlorine, produced in the formation of the metal oxide.

This difficulty is, of course, particularly serious when a very large quantity of the metal oxide is continuously produced, as in the production of pigmentary titanium dioxide.

The solid oxide, which is formed at elevated temperatures, for example in excess of about 850° C. is normally discharged at a temperature above room temperature even though it has been subjected to cooling (for example by mixing with cooled recirculated halogen-containing gases) and if such material is transported in the dry state by any means which is open to the atmosphere, substantial volumes of halogen are released from the solid into the atmosphere. The release of halogen, and particularly of chlorine, is, of course, a serious hazard to health and may give rise to intolerable working conditions.

It is also very desirable, particularly in the case of metal oxides such as titanium dioxide, which are normally subjected after their production to various treatments such as leaching, milling, classification and/or coating, etc., to remove occluded halogen as soon as possible after the material is formed and before such treatments are commenced.

It is an object of the present invention to provide an improved process for the removal of occluded halogen from a solid particulate material.

Accordingly, the present invention is a process comprising transporting solid particulate material containing occluded gas by means of a sealed screw conveyor, introducing into the sealed screw conveyor a carrier gas and thereafter withdrawing the carrier gas containing the occluded gas from the conveyor and thereafter recovering the particulate solid.

As previously noted, the particulate solid to which the process is applied is preferably a metal oxide such as titanium dioxide containing occluded chlorine.

By the term a "sealed" screw conveyor is meant any type of conveyor operating upon the well known screw principle, in which the material being carried by the conveyor is separated from the atmosphere in such a manner that any gas released from the material can leave the conveyor substantially only by a port or ports provided in the casing of the conveyor for this purpose.

Such sealed conveyors, in addition to having the usual lower trough and its contained rotating screw or worm, are also normally provided with an upper cover or lid which, together with the trough, encloses the screw or worm, (with the exception of feed and discharge ports for the solid and/or a port or ports for the carrier gas which may be provided).

During the operation of such conveyors in the process of the present invention a small amount of gas may escape from the conveyor casing through the shaft bearings at each end of the screw but this is undesirable and should be prevented, or minimised, where possible.

The carrier gas, for example air, is preferably passed through the conveyor in the opposite direction i.e. countercurrent, to that in which the solid is being conveyed. One convenient method of achieving this is to introduce the carrier gas into the upper part of the casing, for example above the discharge port for the solid (which is normally in the base of the trough of the conveyor) and to withdraw the carrier gas (and halogen) through the inlet port for the solid. By this means the carrier gas flows over the maximum surface of the solid in the conveyor before being withdrawn.

If desired, the inlet port(s) for the carrier gas and the port from which it is withdrawn may be so positioned that the carrier gas after its introduction flows through a number of such conveyors in series before being withdrawn. One such process is described in the example of this specification.

After the carrier gas has been withdrawn it may be treated to recover its contained halogen or it may be discharged to the atmosphere in such a manner that no danger or discomfort to personnel is caused.

The carrier gas is introduced into the conveyor so that it flows from the point at which it is introduced over the solid to the point at which it is withdrawn from the conveyor. In order to assist the flow of gas through the casing, suction may, if desired, be applied at the point from which the carrier gas is withdrawn from the conveyor.

By the process of the present invention the use of separate conveying and degassing steps are avoided and there is, therefore, a minimum of delay in the passage of the pigment from the reactor in which it is formed to subsequent treatment, for example to the formation of a slurry prior to carrying out leaching, milling and/or coating steps.

The following example shows one embodiment of the present invention which is described with reference to the accompanying diagrammatic drawing.

Example

Particulate titanium dioxide prepared by the oxidation of titanium tetrachloride at a temperature of about 1100° C. was cooled to about 50° C. before collection in hopper 1. Provision was made in the hopper for the withdrawal of gaseous products, mainly chlorine, through filter 2 and port 3 to a chlorine recovery system (not shown).

From the hopper, titanium dioxide was withdrawn by a first screw conveyor 4 and the solids outlet from this conveyor was connected by means of a gas-tight conduit to the solids inlet port of a second conveyor 5. The solids outlet port of the second conveyor was, in turn, connected by a gas-tight conduit to the solids inlet of a third conveyor 6 which was rubbed lined and which discharged the titanium dioxide directly into the slurrying tank 7.

Air, at a flow rate of about 5 cu. ft./min., was introduced into the second conveyor at a point 8 above the solids outlet port from this conveyor.

About 4½ cu. ft./min. of the air passed to the left along the second conveyor to the solids inlet port of that conveyor. The carrier gas then passed through the solids in the hopper through filter 2 to port 3 and finally to the chlorine recovery plant.

The remaining small proportion of the carrier gas passed to the right through the third conveyor (containing titanium dioxide from which most of the chlorine had already been removed) and into the slurry tank 7, from which it was vented to atmosphere via port 9. This small flow of carrier gas assisted in reducing the ingress of liquid from the slurry tank into conveyor 6.

The apparatus shown had a throughput of about 10 tons/day and the titanium dioxide passing into the slurry tank contained less than 200 p.p.m. chlorine whereas the titanium dioxide in the hopper 1 contained about 5000 p.p.m. chlorine.

What is claimed is:

1. A process for the removal of occluded gas from a solid, particulate material comprising the steps of:
   (a) providing a vessel sealed from the atmosphere having gas and solids inlet and exit ports;
   (b) transporting said solid, particulate material containing occluded gas with mixing agitation through said vessel;
   (c) passing a carrier gas through said vessel in countercurrent to said solid particulate material;
   (d) withdrawing from said vessel said carrier gas enriched in occluded gas; and
   (e) withdrawing from said vessel said solid, particulate material with substantially reduced content of occluded gas.

2. A process in accordance with claim 1 wherein said vessel comprises a sealed screw impeller and wherein said carrier gas is introduced into the upper part of the casing of the sealed screw impeller above the discharge port for said solid materials and is withdrawn through the inlet port for said solid materials.

3. A process as claimed in claim 1 wherein the solid particulate material is titanium dioxide and the occluded gas is chlorine.

4. A process as claimed in claim 1 wherein the solid is conveyed by a number of sealed screw conveyors and the carrier gas passes through these before being withdrawn.

5. A process as claimed in claim 1 wherein suction is applied at the point at which the carrier gas and occluded gas is withdrawn.

References Cited

UNITED STATES PATENTS

| | | | |
|---|---|---|---|
| 245,274 | 8/1881 | Byerley | 34—33 |
| 705,787 | 7/1902 | Pratt | 34—33 X |
| 1,874,735 | 8/1932 | Barstow et al. | |
| 2,340,610 | 2/1944 | Muskat et al. | |
| 2,596,950 | 5/1952 | Wolff | 23—120 |
| 3,165,380 | 1/1965 | Warner. | |
| 3,253,889 | 5/1966 | Wildt et al. | |
| 3,350,848 | 11/1967 | Brater et al. | 55—71 |

FREDERICK L. MATTESON, Jr., *Primary Examiner.*

ROBERT A. DUA, *Assistant Examiner.*

U.S. Cl. X.R.

23—202; 55—71, 77